(12) United States Patent
Rouviere et al.

(10) Patent No.: US 9,451,093 B2
(45) Date of Patent: Sep. 20, 2016

(54) TELECOMMUNICATION METHOD AND SYSTEM OFFERING A PLURALITY OF MUTUALLY CONSISTENT MEANS FOR ACCESS TO A MESSAGE BASE

(75) Inventors: Céline Rouviere, Pommiers (FR); Julien Calviac, Paris (FR)

(73) Assignee: FRANCE TELECOM, Paris (FR)

( * ) Notice: Subject to any disclaimer, the term of this patent is extended or adjusted under 35 U.S.C. 154(b) by 410 days.

(21) Appl. No.: 12/515,249

(22) PCT Filed: Nov. 8, 2007

(86) PCT No.: PCT/FR2007/052317
§ 371 (c)(1),
(2), (4) Date: May 15, 2009

(87) PCT Pub. No.: WO2008/059158
PCT Pub. Date: May 22, 2008

(65) Prior Publication Data
US 2010/0017473 A1    Jan. 21, 2010

(30) Foreign Application Priority Data
Nov. 15, 2006  (FR) ..................................... 06 54919

(51) Int. Cl.
*G06F 15/16*  (2006.01)
*H04M 3/533*  (2006.01)
*H04M 3/537*  (2006.01)

(52) U.S. Cl.
CPC ............ *H04M 3/533* (2013.01); *H04M 3/537* (2013.01); *H04M 2201/22* (2013.01)

(58) Field of Classification Search
CPC .......... H04L 29/08693; H04M 3/533; H04M 3/537; H04M 2201/22

USPC .................................................. 709/204–207
See application file for complete search history.

(56) References Cited

U.S. PATENT DOCUMENTS

| | | | | |
|---|---|---|---|---|
| 5,583,993 | A  * | 12/1996 | Foster et al. ................... | 709/205 |
| 6,697,458 | B1 * | 2/2004 | Kunjibettu .................. | 379/88.17 |
| 6,779,019 | B1 * | 8/2004 | Mousseau et al. ........... | 709/206 |

(Continued)

FOREIGN PATENT DOCUMENTS

| | | |
|---|---|---|
| GB | 2365260 A | 2/2002 |
| WO | 2006051232 A1 | 5/2006 |

OTHER PUBLICATIONS

International Search Report of Counterpart Application No. PCT/FR2007/052317 filed on Nov. 8, 2007.

(Continued)

*Primary Examiner* — Minh-Chau Nguyen
(74) *Attorney, Agent, or Firm* — David D. Brush; Westman Champlin & Koehler, P.A.

(57) ABSTRACT

A telecommunication method is provided, which includes storing at least one message in a message base and defining a set of communication devices. The method further includes sending each device in the set, a notification of at least one event relating to the message. The method offers a plurality of mutually consistent methods of access to a message base using only targeted transmission of signaling messages of content that is directly linked to messages having content or status that has been modified, thereby considerably limiting transmission of superfluous data needlessly consuming bandwidth.

8 Claims, 2 Drawing Sheets

(56) References Cited

U.S. PATENT DOCUMENTS

| | | | |
|---|---|---|---|
| 6,838,986 B2* | 1/2005 | Shteyn | 340/531 |
| 6,999,566 B1* | 2/2006 | Eason et al. | 379/88.22 |
| 7,630,637 B2* | 12/2009 | Mizutani et al. | 398/67 |
| 7,647,595 B2* | 1/2010 | Chandrasekaran | 719/318 |
| 7,809,812 B2* | 10/2010 | Doumuki | 709/222 |
| 8,055,262 B1* | 11/2011 | Vu | H04W 4/10 455/433 |
| 8,078,476 B2* | 12/2011 | Alperin et al. | 709/219 |
| 2004/0228469 A1* | 11/2004 | Andrews et al. | 379/265.03 |
| 2005/0032527 A1* | 2/2005 | Sheha et al. | 455/456.1 |
| 2006/0009198 A1* | 1/2006 | Kasai et al. | 455/412.1 |
| 2006/0085271 A1* | 4/2006 | Tokita | G06Q 30/06 705/26.8 |
| 2006/0168087 A1* | 7/2006 | Lescuyer | H04L 12/581 709/207 |
| 2008/0040441 A1* | 2/2008 | Maes | 709/207 |
| 2008/0065725 A1* | 3/2008 | Choi | 709/204 |
| 2008/0101558 A1 | 5/2008 | Babagbeto et al. | |
| 2009/0157831 A1* | 6/2009 | Tian et al. | 709/206 |
| 2009/0293069 A1* | 11/2009 | Yang et al. | 719/318 |
| 2010/0011070 A1* | 1/2010 | Zhao et al. | 709/206 |
| 2010/0093284 A1* | 4/2010 | Terrero Diaz-Chiron et al. | 455/67.11 |

OTHER PUBLICATIONS

English translation of the International Written Opinion dated Jun. 16, 2009 for corresponding International Application No. PCT/FR2007/052317, filed Nov. 8, 2007.

* cited by examiner

TELECOMMUNICATION METHOD AND SYSTEM OFFERING A PLURALITY OF MUTUALLY CONSISTENT MEANS FOR ACCESS TO A MESSAGE BASE

CROSS-REFERENCE TO RELATED APPLICATIONS

This Application is a Section 371 National Stage Application of International Application No. PCT/FR2007/052317, filed Nov. 8, 2007 and published as WO 2008/059158 on May 22, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a telecommunication method and system using a message base to store messages intended for a user of said system.

BACKGROUND OF THE DISCLOSURE

The same user may have a plurality of communication devices able to receive such messages, for example various terminals each provided with a screen, such as personal computers, portable or otherwise, mobile telephones or personal digital assistants, as well as other terminals with no screen but able to reproduce messages in sound form only or in any other non-text form. These various terminals will then most often be connected individually to the message base, either directly or via one or more cable or other communication networks, and thus have individual access to its content.

Thus if such a user uses one terminal to modify the content of the message base or the status of one or more of the messages contained therein, that user's other terminals will in theory remain unaware of the modification, and there is therefore the risk of those other terminals offering an out-of-date view of the content of the message base.

Thus if a message included in the base is read by the user by means of a first terminals only that terminal will retain a trace of that action, and so other terminals of that user will show said message as unread, therefore unnecessarily attracting the user's attention, who will potentially waste valuable time re-reading at least part of said message before realizing it had already been read.

To alleviate such drawbacks, some electronic messaging services use means having the essential function of placing the message base in a centralized position and conferring on its content a reference quality for any terminal that has been caused to connect to it, each terminal then downloading the content of the message base during connection initialization. In such messaging services, different terminals can therefore still have disparate contents, and in principle all that is achieved is that, following a connection to the message base by means of a given terminal, said given terminal will show the content of that base to the user reliably.

In order for each of the user's terminals to reproduce the content of the message base relatively reliably, automatic and periodic triggering of simultaneous downloads of said content into storage means in each of the terminals has been envisaged in the prior art, but such indiscriminate downloading of the entire content of the base generates a large volume of traffic via one or more networks of limited bandwidth, only to achieve a result that is not entirely satisfactory because the various representations of the content of the message base offered by the various terminals are identical only immediately after such simultaneous downloads have been effected.

SUMMARY

An aspect of the disclosure relates to a telecommunication method including a step of storing at least one message in a message base and a step of defining a set including at least one communication device, which method also includes a step of sending each device in said set a notification of at least one event relating to a message stored in the message base.

According to an embodiment of the invention, as soon as an event occurs affecting a message contained in the message base, each communication device identified beforehand as needing to be informed receives a notification message enabling it to update its own message base.

It is therefore no longer a question of indiscriminate and periodic downloading of the entire content of the message base to all a user's terminals, but simply of sending a targeted signaling message to only those devices that the user has selected for this purpose during the definition step, the content of which signaling message is directly linked to a message whose content or status has been modified; this considerably limits the transmission of superfluous data consuming bandwidth unnecessarily.

In one particular implementation of an embodiment of the invention, a method as described above further includes a step of at least one device included in said set signaling at least one event relating to a message stored simultaneously in said device and in the message base.

Such a signaling step enables a device to instigate updating of the message base, which is therefore relieved of its reference quality, which was a result of the necessity in the prior art to perform systematic downloads. The fact that a device can signal to the message base an event instigated by that device then makes it possible, simply by the principle of transitivity, to notify that event to all the devices preselected during the definition step, in order to invite them to carry out an update targeted on the message that the event specifically concerns.

In a first variant of the invention, the definition step includes a user selecting at least one communication device that is specific to the user and requesting the management means of the message base to register each selected device as a recipient of event notifications.

In this first variant, it is the user who triggers a storage procedure for each device selected for this purpose, and who therefore has total control over this procedure, because as it proceeds the user physically checks the terminal concerned by means of a specific man-machine interface.

In a second variant of the invention, which may be implemented instead of or in combination with the first variant, the definition step includes storing in management means of the message base a list including at least one identifier of a communication device and said management means sending each targeted device in said list an invitation to send back a request to register said device as a recipient of event notifications.

The benefit of such a variant is that it enables automatic registration of all terminals selected for this purpose, because each of those terminals will solicit its own registration as soon as it is invited to do so by the management means of the message base, requiring no intervention by the user other than a possible contribution to the creation of the list of devices selected.

By way of the product obtained by executing a method as described above, a first hardware aspect of an embodiment of the invention relates to a signal sent by a communication device and bearing a request to register said device as a recipient of notifications of events relating to at least one message stored in the message base.

By way of means useful for implementing the method a second hardware aspect of an embodiment of the invention relates to a computer program including at least one series of program code instructions for executing at least one notification step included in a method conforming to the above description, when said program is executed on a computation device.

Such a computer program may be installed not only in the management means of the message base but also in each of the devices selected during the definition step.

Another hardware aspect of an embodiment of the invention relates to a telecommunication system including means for storing at least one message in a message base, means for defining a set including at least one communication device, and means for sending each device in said set a notification of at least one event relating to a message stored in the message base.

By way of means useful for implementing the method, a further hardware aspect of an embodiment of the invention relates to a communication device including means for storing at least one message in a message base and means for sending to at least one device included in a predefined set a notification of at least one event relating to said message.

BRIEF DESCRIPTION OF THE DRAWINGS

One or more embodiments of the invention can be better understood in the light of the following description, given by way of non-limiting example and with reference to the appended drawings, in which.

DETAILED DESCRIPTION OF ILLUSTRATIVE EMBODIMENTS

Figure 1:
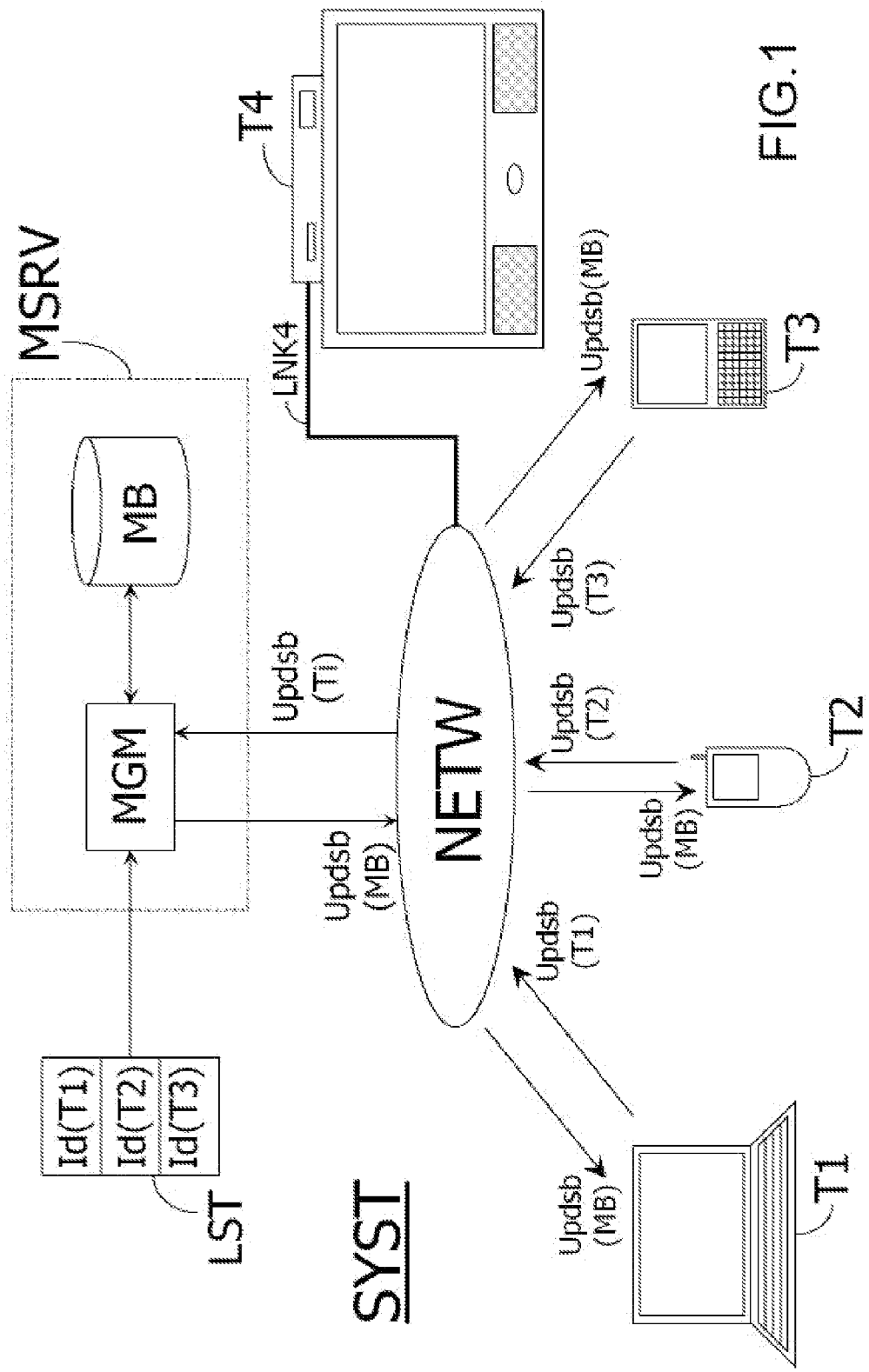
FIG. 1 is a partial functional block diagram showing a stage of initializing a telecommunication system implementing an embodiment of the invention.

FIG. 1 represents diagrammatically a telecommunication system SYST using an embodiment of the present invention. In this particular embodiment, the system SYST includes a messaging server MSRV that includes a message base MB and management means (e.g., a management computation device) MGM that manage said base.

This messaging server MSRV is able to communicate with at least one communication network NETW, for example a meshed network conforming to an Internet type protocol, possibly via a cable access network of optical or switched telephone type, or via a wireless network, for example one conforming to the Wi-Fi standard IEEE 802.11.

In the embodiment of the invention described here, the system SYST includes first, second, third, and fourth terminals T1, T2, T3, and T4 all belonging to the same user and respectively represented in this example by a personal computer, a mobile telephone, a personal digital assistant, and a television set-top box. These terminals are also connected to the communication network NETW and are therefore able to interact with the messaging server MSERV.

It must be clearly understood that although, with the aim of simplification to facilitate an understanding of an embodiment of the invention, a single plurality of terminals belonging to a single user is represented in this figure, the message base MB in the messaging server MSRV is in principle divided in such a manner as to be able to host individual bases specific to as many users, having respective pluralities of their own terminals and therefore, by means of an embodiment of the invention, also having the benefit of a plurality of mutually consistent access means to their own message bases.

In the embodiment of the invention described here, a set of terminals selected from the plurality of terminals T1, T2, T3, and T4 is created during a definition step. In the present example, the fourth terminal T4 is not included in this set, although it is connected to the communication NETW by a communication link LNK4. The set of terminals selected during the definition step comprises only the first, second, and third terminals T1, T2, and T3. The set (T1, T2, T3) can be defined in various ways:

A first variant of the definition step includes the user selecting the terminals T1, T2, and T3 and requesting the management means MGM of the message base MB to register each selected terminal as an addressee of event notifications. Thus the terminals T1, T2, and T3 send respective signals Updsb(T1), Updsb(T2), and Updsb(T3) bearing such requests, which the management means MGM receive via the communication network NETW in the form of signals Updsb(Ti).

The management means MGM then know the various identities of the terminals belonging to the set (T1, T2, T3) of selected terminals, and can send back to each of those terminals a signal Updsb(MB) bearing a request to register the message base MB as an addressee of event notifications.

A second variant of the definition step includes storing in the management means MGM of the message base a list LST including the identifiers Id(T1), Id(R2), and Id(T3) of selected terminals and said management means MGM sending each terminal Ti (for i=1 to 3) in said list LST an invitation to send back a request Updsb(Ti) to register said terminal as an addressee of event notifications.

Such an invitation can take the form of a signal Updsb (MB) bearing a request to register the message base MB as an addressee of event notifications, in response to which the terminals present themselves to the management means MGM in a form that is the converse of the mode of operation described in the context of the first variant and in conformance with the embodiment represented in this figure.

The invitation referred to above can alternatively take the form of the management means MGM sending each terminal Ti (for i=1 to 3) in said list LST a specific message (not shown here) of the "REFER" type provided by a session initiation protocol (SIP), in response to which the signal Updsb(Ti) sent by each terminal Ti (for i=1 to 3) will bear a "SUBSCRIBE" type message.

Figure 2:
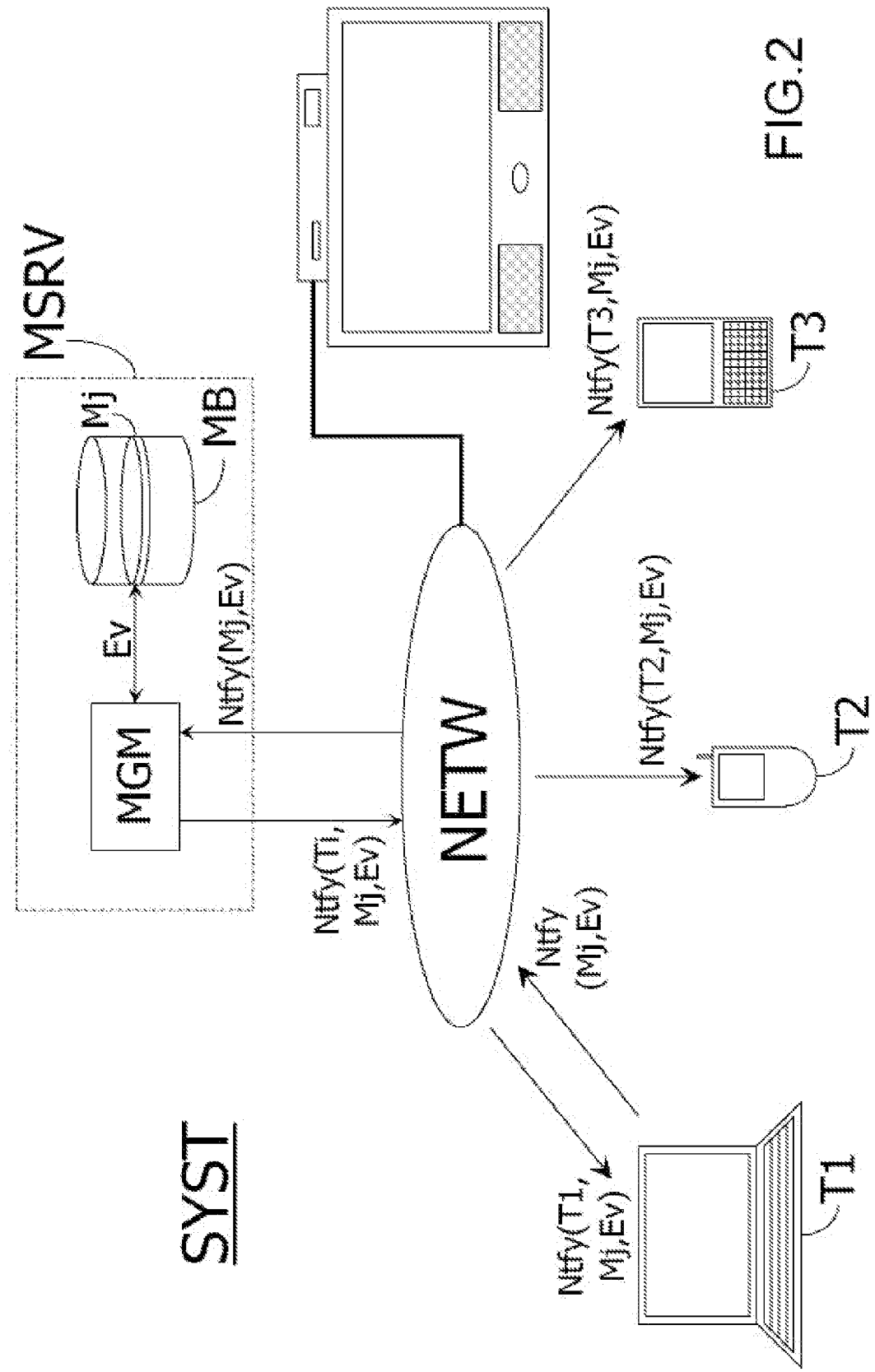
FIG. 2 is a partial functional block diagram showing one possible mode of operation of said telecommunication system.

FIG. 2 represents a method conforming to one particular embodiment of the invention for sending notification messages in the telecommunication system SYST described above. After execution of a storage step in which the messaging server MSRV stores a new message Mj in the message base MB, the management means MGM execute a step of sending each terminal Ti (for i=1 to 3) belonging to the set (T1, T2, T3) of selected terminals a signal Ntfy(Ti, Mj, Ev) notifying an event Ev relating to the message Mj, which event consists here simply of its arrival and storage in the message base. This message Mj appears with an attribute representing an "unread" status for a user accessing the message base via one of the terminals Ti (for i=1 to 3), which attribute can for example be represented by a display in bold of a descriptor of the message Mj.

When the user reads this message using the first terminal T1, and therefore changes its status attribute from "unread" to "read", the first terminal sends a signal Ntfy(Mj, Ev) notifying this new event Ev relating to the message Mj to the management means MGM of the message base MB, which can therefore be updated, after which the new event, as reflected in the change of the status attribute of the message Mj from "unread" to "read", is notified by the management means MGM to the terminals belonging to the set (T1, T2, T3) during a step of sending notification signals Ntfy(Ti, Mj, Ev). In some embodiments, the terminal instigating the event Ev that is the subject of the notification, here the first terminal T1, can be excluded from the list of recipients of the notification signals Ntfy(Ti, Mj, Ev) sent by the management means MGM whereas, in other embodiments, this instigator terminal can also be a recipient of a notification, which thus serves as an acknowledgement of the notification signal Ntfy(Mj, Ev) that it initially sent.

Sending notification signals as described above is advantageously controlled by computer programs including at least one series of program code instructions triggering the execution of a notification step when said program is executed on a computation device. Such a computer program can then be installed not only in the management means MGM of the message base but also in each of the terminals T1, T2, and T3 selected during the definition step.

By one particular embodiment of the invention described above, as soon as an event Ev occurs affecting a message Mj contained in the message base MB, each communication device previously identified as needing to be informed, whether this is a terminal Ti (for i=1 to 3) or the messaging server MSRV, receives a notification message enabling it to update its own message base.

An embodiment of the invention therefore offers a plurality of mutually consistent means of access to a message base using only targeted transmission of signaling messages of content that is directly linked to messages having content or status that has been modified, thereby considerably limiting transmission of superfluous data needlessly consuming bandwidth.

Although the present disclosure has been described with reference to one or more examples, workers skilled in the art will recognize that changes may be made in form and detail without departing from the scope of the disclosure and/or the appended claims.

The invention claimed is:

1. A telecommunication method comprising:
   managing user readable messages stored in a message base of a messaging server for a set of at least two terminals belonging to a same user, said terminals accessing said message base, said method being processed by the messaging server and comprising:
   a step of receiving a request to register each of said terminals in said set as an addressee to receive event notifications from the messaging server relating to events occurring at the message base;
   a step of sending to each of said terminals in said set a request to register the message base as an addressee to receive event notifications from the terminals in the set relating to events occurring at the terminals in the set;
   a step of sending to at least one of said terminals in said set an event notification after arrival and storage of a message in an individual base of the message base, said individual base being specific to the user and being accessible to the at least two registered terminals of the set;
   a step of receiving a first event notification signaling at least one event instigated by a first terminal in said set and relating to the message stored in said individual base; and
   a step of sending a second event notification signaling said at least one event, instigated by said first terminal, to at least each terminal in said set other than said first terminal.

2. A method according to claim 1, wherein the method further includes storing in the messaging server that manages the message base a list including at least one identifier of each terminal in the set, and said messaging server sending each terminal in said list an invitation to send back said request to register said terminal as an addressee of event notifications.

3. A method comprising:
   sending to a messaging server, which manages user readable messages stored in a message base, a request from a first terminal, which belongs to a set of at least two terminals belonging to a same user and accessing the message base managed by the messaging server, a request to register the first terminal as an addressee to receive event notifications from the messaging server relating to events occurring at the message base;
   receiving from the messaging server by the first terminal a request to register the message base as an addressee to receive event notifications relating to events occurring at the first terminal;
   receiving from the messaging server an event notification by the first terminal after arrival and storage of a message in an individual base of the message base, said individual base being specific to the user and being accessible to the at least two registered terminals of the set;
   sending to the messaging server a first event notification signaling at least one event instigated by said first terminal and relating to the message stored in said individual base; and
   receiving a second event notification signaling an event relating to a message stored in said message base and instigated by another terminal of said set.

4. A method according to claim 3, wherein the step of sending a second notification comprises the first terminal signaling at least one event relating to a message stored simultaneously in said first terminal and in the message base.

5. A method according to claim 3, wherein the method further comprises selecting at least one of the terminals that belong to the user and sending the request to register the selected terminal to the messaging server, which manages the message base to register each selected terminal as an addressee of the event notifications.

6. A non-transitory computer-readable medium comprising a computer program recorded thereon and installed in a computation device, the program including at least one series of program code instructions for executing a telecommunication method by a messaging server, which manages user readable messages stored in a message base, when said program is executed on the computation device, wherein the method comprises the following steps processed by the messaging server:
- a step of receiving a request to register each of a set of at least two terminals belonging to a same user and accessing said message base, as an addressee to receive event notifications from the messaging server relating to events occurring at the message base;
- a step of sending to each of said terminals in said set a request to register the message base as an addressee to receive event notifications relating to events occurring at the terminals in the set;
- a step of sending to at least one of said terminals in said set an event notification after arrival and storage of a message in an individual base of the message base, said individual base being specific to the user and being accessible to the at least two registered terminals of the set;
- a step of receiving a first event notification signaling at least one event instigated by a first terminal in said set and relating to the user readable message stored in said individual base; and
- a step of sending a second event notification signaling said at least one event, instigated by said first terminal, to at least each terminal in said set other than said first terminal.

7. A telecommunication system for managing user readable messages stored in a message base, said telecommunication system comprising a messaging server, which manages the message base and comprises:
- means for receiving a request to register each of a set of at least two terminals belonging to a same user and accessing the message base, as an addressee to receive event notifications from the messaging server relating to events occurring at the message base;
- means for sending to each of said terminals in said set a request to register the message base as an addressee to receive event notifications from the terminals in the set relating to events occurring at the terminals in the set;
- means for sending to each of said terminal in said set an event notification after arrival and storage of a message in an individual base of the message base, said individual base being specific to the user and being accessible to the at least two registered terminals of the set;
- means for receiving a first event notification signaling at least one event instigated by a first terminal in said set and relating to the user readable message stored in said individual base; and
- means for sending a second event notification signaling said at least one event, instigated by said first terminal, to at least each terminal in said set other than said first terminal.

8. A first terminal belonging to a set of at least two terminals belonging to a same user and accessing a message base storing user readable messages and managed by a messaging server, said terminal comprising:
- means for sending to the messaging server a request to register said first terminal as an addressee to receive event notifications from the messaging server relating to events occurring at the message base;
- means for receiving from the messaging server a request to register the message base as an addressee to receive event notifications from the terminal relating to events occurring at the terminal;
- means for receiving from the messaging server an event notification after arrival and storage of a message in an individual base of the message base, said individual base being specific to the user and being accessible to the at least two registered terminals of the set;
- means for sending to the messaging server a first event notification signaling at least one event instigated by said first terminal and relating to the user readable message stored in said individual base; and
- means for receiving a second event notification signaling one event relating to a user readable message stored in said message base and instigated by another terminal from said set.

* * * * *